US009927528B2

(12) United States Patent
Jarmuszewski et al.

(10) Patent No.: US 9,927,528 B2
(45) Date of Patent: Mar. 27, 2018

(54) SYSTEMS AND METHODS FOR MANAGING POWER CONSUMPTION OF A GNSS RECEIVER

(71) Applicant: DBJay Inc., Waterloo (CA)

(72) Inventors: Perry Jarmuszewski, Waterloo (CA); George Mankaruse, Kitchener (CA); Rongrong Zhang, Kitchener (CA)

(73) Assignee: Spark Technology Labs Inc., Waterloo (CA)

( * ) Notice: Subject to any disclaimer, the term of this patent is extended or adjusted under 35 U.S.C. 154(b) by 364 days.

(21) Appl. No.: 14/720,923

(22) Filed: May 25, 2015

(65) Prior Publication Data
US 2016/0349377 A1 Dec. 1, 2016

(51) Int. Cl.
 *G01S 19/24* (2010.01)
 *G01S 19/09* (2010.01)
 *G01S 19/34* (2010.01)

(52) U.S. Cl.
 CPC .................... *G01S 19/34* (2013.01)

(58) Field of Classification Search
 CPC ................ G01S 19/24; G01S 19/34
 USPC ........... 342/357.25, 357.46, 357.63, 357.74; 701/468, 490, 507
 See application file for complete search history.

(56) References Cited

U.S. PATENT DOCUMENTS

| 7,577,516 | B2 * | 8/2009 | Dobeck | G01C 21/20 342/357.52 |
|---|---|---|---|---|
| 2005/0237347 | A1 * | 10/2005 | Yamaji | G01D 5/14 347/5 |
| 2015/0198722 | A1 * | 7/2015 | Ben-Akiva | G01S 19/49 701/472 |

* cited by examiner

*Primary Examiner* — Dao L Phan

(57) ABSTRACT

The disclosure describes methods of managing the power consumption of a GNSS receiver by identifying when to activate and deactivate the GNSS receiver, and by managing storage of GNSS location data points. In one embodiment, the GNSS receiver is activated if there is a change in wireless transmissions from stationary sources. In another embodiment, the GNSS receiver is deactivated when the GNSS signal quality is sufficient to calculate a GNSS location. In another embodiment, the GNSS receiver is deactivated for a time period in correlation with a GNSS speed. In yet another embodiment, redundant GNSS location data points are identified and only non-redundant data points are stored. In yet another embodiment, a GNSS device comprises a processor and a GNSS receiver configured to track GNSS signals and calculate a GNSS location. The GNSS receiver deactivates when the average signal quality value meets or exceeds the baseline signal value.

18 Claims, 8 Drawing Sheets

SYSTEMS AND METHODS FOR MANAGING POWER CONSUMPTION OF A GNSS RECEIVER

TECHNICAL FIELD

The present disclosure relates generally to global navigation satellite system (GNSS) devices, and more particularly to systems and methods for managing the power consumption of a GNSS receiver, and devices therefor.

BACKGROUND

GNSS devices are configured to determine their physical location by using GNSS signals from satellites. There are currently several types of operational and planned GNSS'es, including, without limitation, the American Global Positioning System (GPS), the Russian Global Navigation Satellite System (GLONASS), the Chinese BeiDou Satellite Navigation Experimental System (BeiDou), the European Galileo system, and the Indian Regional Navigation Satellite System (IRNSS).

A GNSS device includes a GNSS receiver, which receives and decodes the GNSS signals. The signals provide an indication of the physical location of the device. The GNSS device may also include a communication subsystem to transmit the physical location information to another device, such as a server, a third party device, or a user device. Accordingly, GNSS devices are commonly used to track the physical location of vehicles, shipments, or other movable assets. By providing the tracking data, the GNSS devices enable asset managers to utilize their assets more efficiently. Additionally, the GNSS devices deter theft of assets and permit asset recovery.

In other use cases, the GNSS devices are used to track the physical location of individuals, including the elderly, teenagers, children, and handicapped persons. The tracking data provides peace of mind and enables loved ones to track down missing persons.

However, to be of any use, such GNSS device must remain powered on, either through battery power or through auxiliary power. Accordingly, a GNSS device that is configured to manage the power consumption of the device is desirable.

SUMMARY

According to a first aspect of the invention, there is provided a method for deactivating a GNSS receiver, comprising the steps of tracking a GNSS signal from each of at least four GNSS satellites, computing an average signal quality value of the tracked GNSS signals, and when the average signal quality value is greater than or equal to a baseline signal quality value, calculating a GNSS location, and deactivating the GNSS receiver.

In another aspect of the present invention, there is provided a method for deactivating a GNSS receiver, comprising the steps of calculating a GNSS location and a GNSS speed associated with the GNSS location, setting a time period in correlation with the GNSS speed and deactivating the GNSS receiver for the time period.

In yet another aspect of the present invention, there is provided a GNSS device comprising a processor, and a GNSS receiver configured to track a GNSS signal from each of at least four GNSS satellites, compute an average signal quality value of the tracked GNSS signals, and calculate a GNSS location when the average signal quality value is greater than or equal to a baseline signal quality value. The device further includes a memory coupled to the processor and having instructions stored thereon for deactivating the GNSS receiver, wherein the processor is configured to deactivate the GNSS receiver when the average signal quality value is greater than or equal to a baseline signal quality value.

The foregoing embodiments of the present invention, and other embodiments, will become more fully apparent from a review of the description and claims which follow.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

Figure 1:
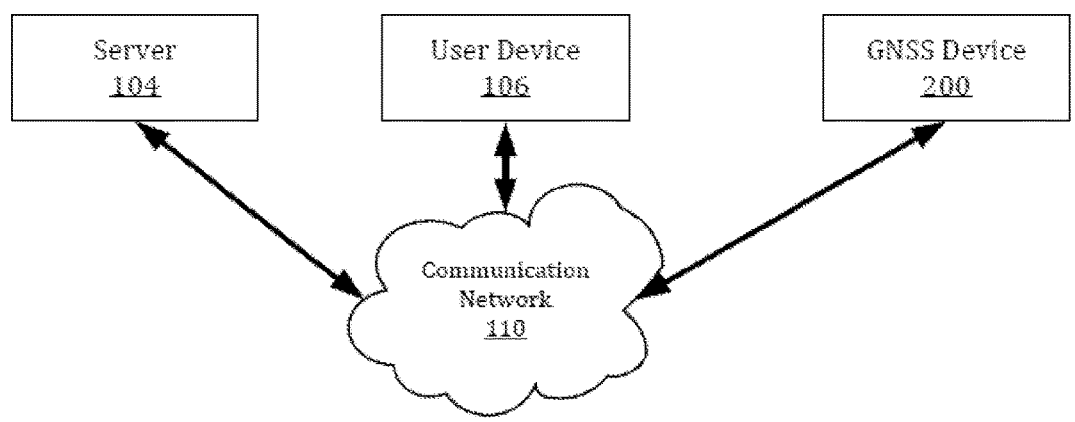
FIG. 1 illustrates in block-diagram form an example environment within which the techniques of the present disclosure can be practiced.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF EXAMPLE EMBODIMENTS

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

At the outset, it should also be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Reference is now made to FIG. 1 which illustrates in block diagram form, an example environment in which a GNSS device can operate. In the example environment depicted in FIG. 1, a GNSS device 200 is communicatively coupled to a user device 106 and a server 104 via a communication network 110, such as a local area network (LAN) or a wide area network (WAN), such as the Internet, or a combination thereof. Furthermore, the communication network 110 may include both wireless and wired components. For example, the communication network 110 may communicate with the GNSS device 200 via a cellular communication link or via a wireless LAN, and with the server 104 via a wired LAN.

In this embodiment, the server 104 includes a processor, a communication interface, non-transient computer readable medium containing program instructions, and a persistent memory for data storage. The server 104 receives, via the communication network 110, data from the GNSS device 200, and stores the data in the persistent memory. The server 104 may also receive data access requests from the user device 106, and may send to the user device 106 data collected by the GNSS device 200.

In this embodiment, the user device 106 includes a processor, a communication interface, non-transient computer readable medium containing program instructions. The user device 106 is configured to access data stored on the server 104. Examples of the user device 106 include, but are not limited to, a mobile phone, smartphone or superphone, tablet computer, notebook computer (also known as a laptop, netbook or Ultrabook™ computer depending on the device capabilities), wireless organizer, and personal digital assistant (PDA). The user device 106 may execute a specialized application to access the server 104, or may alternatively access a webpage via the Internet which enables access to the data stored on the server 104.

Figure 2:
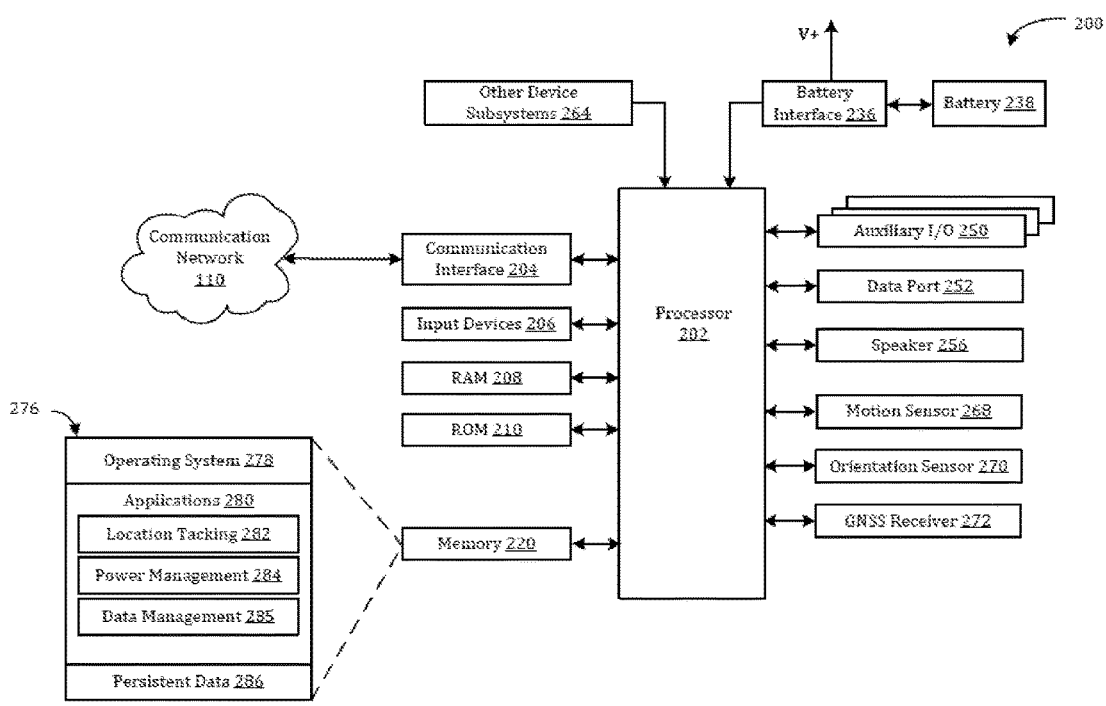
FIG. 2 illustrates in block-diagram form a GNSS device suitable for managing power consumption in accordance with example embodiments of the present disclosure.

Reference is next made to FIG. 2 which illustrates an example mobile GNSS device 200 suitable for receiving and tracking GNSS signals, for calculating GNSS locations, and for storing GNSS location data points in accordance with embodiments of the present disclosure. Examples of the GNSS device 200 include, but are not limited to, a mobile phone, smartphone or superphone, tablet computer, notebook computer (also known as a laptop, netbook or Ultrabook™ computer depending on the device capabilities), a wireless organizer, a personal digital assistant (PDA), or a special purpose GNSS device.

Still referring to FIG. 2, the GNSS device 200 includes a rigid case (not shown) housing the electronic components of the GNSS device 200. The electronic components of the GNSS device 200 are mounted on a printed circuit board (not shown). The GNSS device 200 includes a processor 202 which controls the overall operation of the GNSS device 200. Communication functions are performed through a communication interface 204, wherein the communication interface 204 includes one or more wireless receivers and one or more wireless transmitters, and receives and sends messages via the communication network 110. The communication interface 204 may include a WWAN interface for communication over cellular networks and a WLAN interface for communication over Wi-Fi™ networks.

The processor 202 interacts with other components including one or more input devices 206 such as input keys, RAM 208, ROM 210, persistent (non-volatile) memory 220 which may be flash memory or any other suitable form of memory, auxiliary I/O subsystems 250, one or more data port 252 such as serial data port (e.g. USB data port), a speaker 256, a motion sensor 268 which enables to processor 202 to determine whether the GNSS device 200 is in motion and the nature of any sensed motion at any appropriate time, an orientation sensor 270 which enables the processor 202 to determine which direction the GNSS device 200 is pointed at any appropriate time, a GNSS receiver 272 which enables the processor 202 to determine longitudinal and latitudinal coordinates (i.e. a GNSS location) of the GNSS device 200 at any appropriate time, and other device subsystems generally designated as 264. The components of the GNSS device 200 are coupled via a communications bus (not shown) which provides a communication path between the various components.

The processor 202 of the GNSS device 200 operates under stored program control and executes software modules 275 stored in memory, for example, in the persistent memory 220. The persistent memory 220 stores data 286 such as GNSS location data points. As illustrated in FIG. 2, the software modules 276 comprise operating system software 278 and software applications 280. The software modules 276 or parts thereof may be temporarily loaded into volatile memory such as the RAM 208. The RAM 208 is used for storing runtime data variables and other types of data or information. Although specific functions are described for various types of memory, this is merely one example, and a different assignment of functions to types of memory could be used.

The software applications 280 may include location tracking application 282, power management application 284, and data management application 285. The location tracking application 282 is stored in a non-transient computer readable medium and provides program instructions which cause the GNSS device 200 to activate the GNSS receiver 272, calculate the GNSS location(s), and store the GNSS location(s), in accordance with example embodiments of this disclosure. The power management application 284 is stored in a non-transient computer readable medium and provides program instructions which cause the GNSS device 200 to activate and deactivate the GNSS receiver 272 to conserve battery power when appropriate, in accordance with the example embodiments of this disclosure. The data management application 285 is stored in a non-transient computer readable medium and provides program instructions which cause the GNSS device to store and optionally send GNSS location data points to the server 140, in accordance with example embodiments of this disclosure.

The input devices 206 may include control buttons (not shown) such as a power toggle (on/off) button, and general purpose or context specific buttons. At least some of the control buttons may be multi-purpose buttons rather than special purpose or dedicated buttons.

The communication interface 204 may include a short-range wireless communication subsystem (not shown) which provides a short-range wireless communication interface. The short-range wireless communication interface may be configured in accordance with one or more cellular telecommunication standards, including any of a Bluetooth® standard, an IEEE 802.11 standard, an IEEE 802.15.3a standard (also referred to as UWB), a Z-Wave standard, a ZigBee standard or other suitable short-range wireless communication standard.

A received signal, such as a text message, a server message, or other message, is processed by the communication subsystem 204 and input to the processor 202. The processor 202 processes the received message. The GNSS device 200 may generate data items, for example GNSS location data points, which may be transmitted over the communication network 110 via the communication subsystem 204, for example.

The motion sensor 268 may comprise an accelerometer (such as a three-axis accelerometer) or other suitable motion sensor. The orientation sensor 282 may comprise an accelerometer (such as a three-axis accelerometer), electronic compass, gyroscope, or a combination thereof. Other suitable orientation sensors could be used instead of, or in addition to, the accelerometer, electronic compass, and gyroscope. The motion sensor 268 and orientation sensor 282, or parts thereof, may be combined or shared, for example, within an integrated component. The processor 202, or controller (not shown) of a three-axis accelerometer, can convert acceleration measurements into device orientations.

The GNSS device 200 may optionally include a battery 238 as a power source, which is typically one or more rechargeable batteries that may be charged, for example, through charging circuitry coupled to a battery interface such as the serial data port 252. The battery 238 provides electrical power to at least some of the electrical circuitry in the GNSS device 200, and the battery interface 236 provides a mechanical and electrical connection for the battery 238. The battery interface 236 is coupled to a regulator (not shown) which provides power V+ to the circuitry of the GNSS device 200 from an auxiliary power source (e.g. an A/C adaptor or USB power source).

Figure 3:
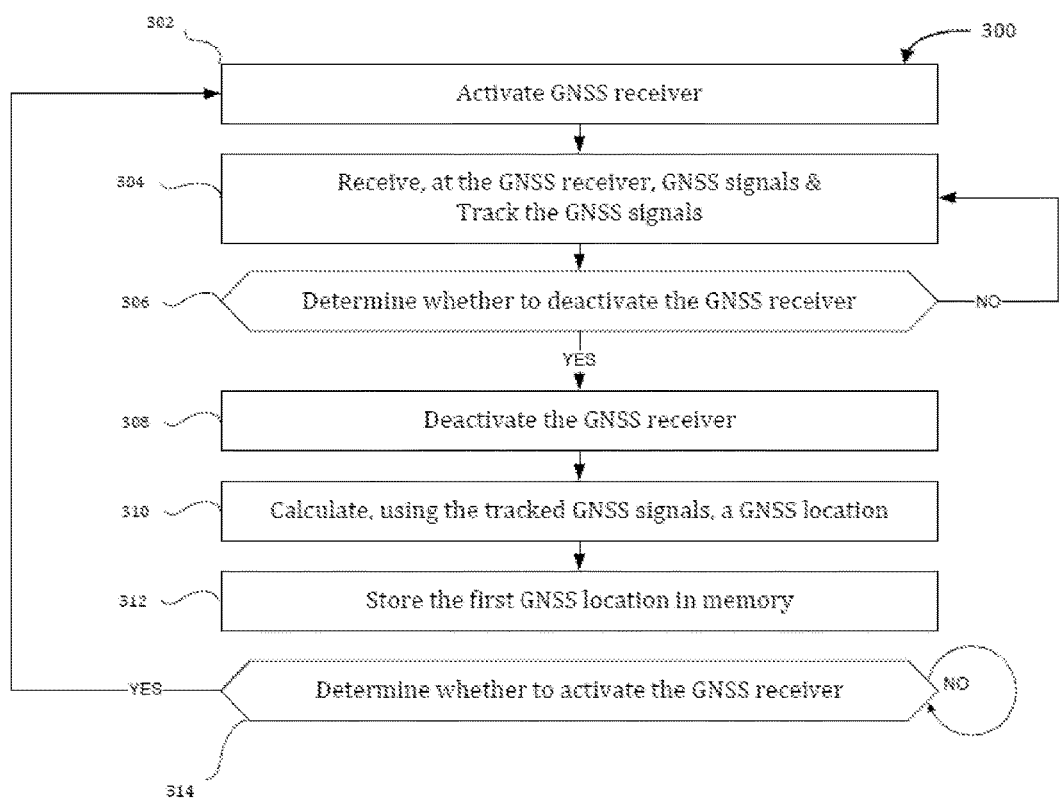
FIG. 3 illustrates a flowchart of a method for activating and deactivating a GNSS device in accordance with example embodiments of the present disclosure.

Reference is now made to FIG. 3 which illustrates a flowchart of a method 300 for activating and deactivating the GNSS receiver 272. The method 300 may be implemented by the GNSS device 200. The method 300 may be carried out by software executed, for example, by a processor, by a GNSS receiver, or by a combination thereof. Steps are identified as being performed by one of the processor and the GNSS receiver, but may be performed by another component. Coding of software for carrying out such a method 300 is within the scope of a person of ordinary skill in the art provided the present disclosure. The method 300 may contain additional or fewer processes than shown and/or described, and may be performed in a different order. Computer-readable code executable by the processor 202 to perform the method 300 may be stored in a computer-readable medium such as a memory of the GNSS device 200.

At step 302, the processor 202 activates the GNSS receiver 272. The processor 202 may activate the GNSS 272 in response to any number of trigger scenarios, including without limitation, a periodic trigger (i.e. the processor 202 activates the GNSS receiver 272 at periodic time intervals), a sensor trigger (i.e. the processor 202 activates the GNSS receiver 272 in response to receiving a sensor input, such as an accelerometer input, which indicates that the GNSS device 200 is in motion), and a wireless communication transmission trigger (i.e. in response to a change in stationary wireless communication transmission as is explained later in this disclosure).

The processor 202 may activate the GNSS receiver 272 in any number of ways. In one embodiment, the GNSS receiver 272 has a high-frequency clock and a low-frequency clock associated therewith. When the low-frequency clock is active, the GNSS receiver 272 enters a low power sleep mode, and when the high-frequency clock is active, the GNSS receiver 272 enters an active mode and is able to receive GNSS signals. Accordingly, to activate the GNSS receiver 272, the processor 202 activates the high-frequency clock associated with the GNSS receiver 272. Similarly, to deactivate the GNSS receiver 272, the processor 202 activates the low-frequency clock associated with the GNSS receiver 272. In another embodiment, the GNSS receiver 272 is deactivated by powering the GNSS receiver 272 down, thereby turning the receiver off, and the GNSS receiver 272 is activated by powering the GNSS receiver 272 up, thereby turning the receiver on.

At step 304, the GNSS receiver 272 is active and receives GNSS signals detected by a GNSS antenna coupled to the GNSS receiver 272 (not shown in FIG. 2). While the GNSS signals are always being transmitted and detected by the GNSS antenna associated with the GNSS receiver 272, the GNSS receiver 272 does not process the GNSS signals until it is active. The GNSS receiver 272 may, for example, include a low noise amplifier (LNA) which amplifies the GNSS signal for further processing, such as demodulation, by a baseband processor. The baseband processor is included as part of the GNSS receiver 272 in some embodiments, and at other times, is implemented as individual software or hardware component, or a combination thereof.

Furthermore, when active, the GNSS receiver 272 receives GNSS signals and tracks GNSS satellites. To track a GNSS satellite, the GNSS receiver 272 decodes a GNSS signal received from the GNSS satellite. Since the GNSS satellite is always moving, the time required for the GNSS signal to arrive at the GNSS receiver varies continuously, and therefore the GNSS signal itself also varies with time. Accordingly, to track the GNSS satellite, the GNSS receiver 272 continuously monitors the GNSS signal.

At step 306, the processor 202 determines whether to deactivate the GNSS receiver 272 or not. Example embodiments of when the GNSS receiver 272 is activated are discussed in greater detail later in this disclosure, and may include monitoring the signal quality of the GNSS signals received at the GNSS receiver 272. The processor may continuously monitor the signal quality until the condition required to deactivate the GNSS receiver 272 is reached. When the condition is reached, the process proceeds to step 308, where the processor 202 deactivates the GNSS receiver.

At step 310, the GNSS receiver 272 uses GNSS signals received from tracked GNSS satellites to calculate a GNSS location. To compute a GNSS location, the GNSS receiver must track at least four GNSS satellites. The GNSS location is typically calculated as latitude, longitude and, optionally, height coordinates, which represent a physical location. The coordinates may be overlaid onto a map to identify the physical location. At step 312, the GNSS receiver 272 stores the GNSS location (i.e. the coordinates as data points) in the memory 220 of the GNSS receiver 272. The GNSS receiver 272 may optionally send the GNSS location data to the server 140 via the communication interface 204 and through the communication network 110.

At step 314, the processor 202 determines whether to activate the GNSS receiver 272 or not. Example embodiments of when the GNSS receiver 272 is activated are discussed in greater detail later in this disclosure, and may include methods such as receiving a trigger from a sensor, monitoring the GNSS signal quality, the GNSS speed, and wireless communication transmissions. The processor 202 may enter into a low power mode until a trigger is received at the processor indicating that the GNSS receiver is required. When such a trigger is received, the processor activates the GNSS receiver, and returns to step 302.

Figure 4:
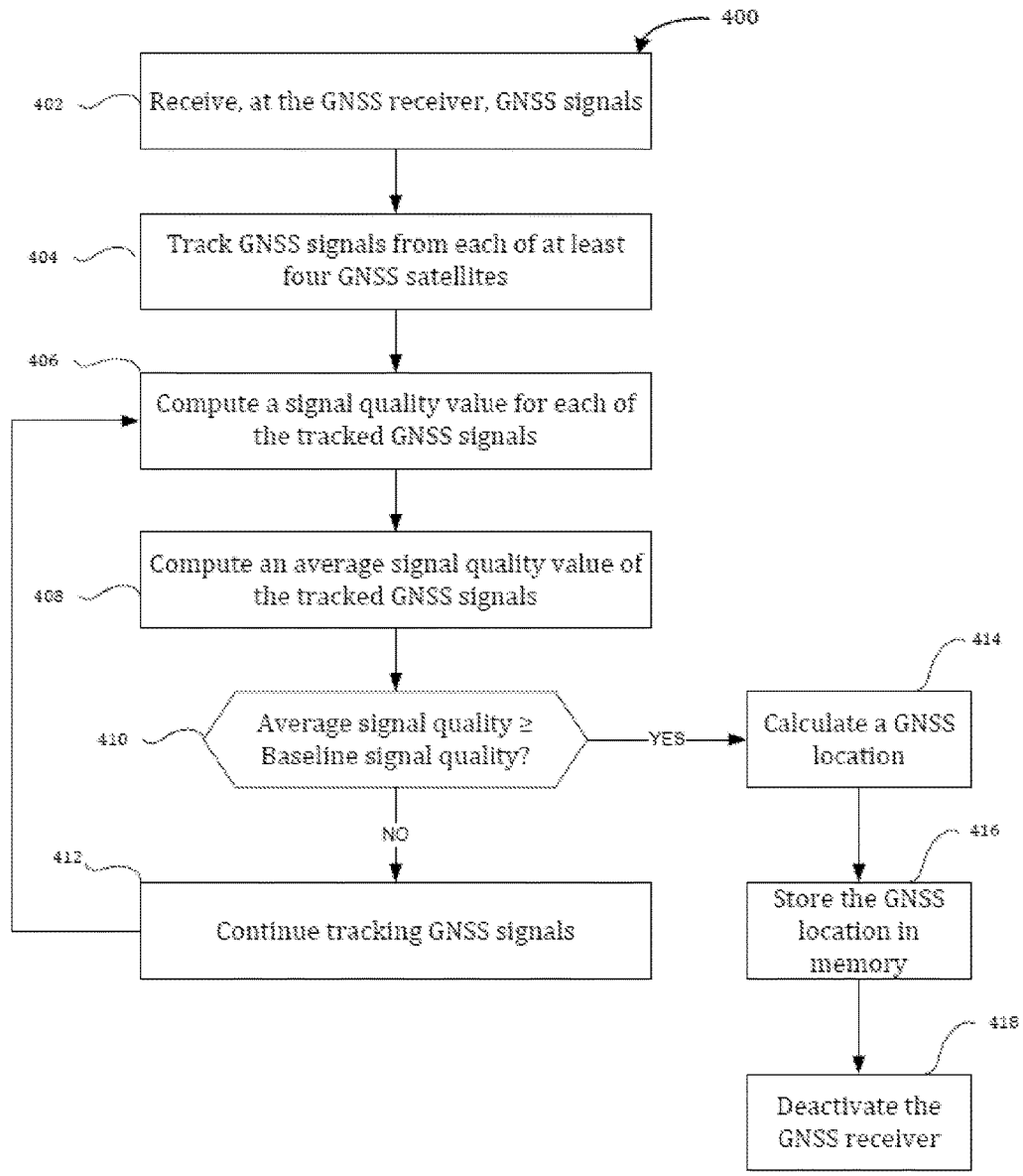
FIG. 4 illustrates a flowchart of a first method for deactivating a GNSS receiver of a GNSS device in accordance with example embodiments of the present disclosure.

Reference is now made to FIG. 4 which illustrates a flowchart of an example method 400 for deactivating the GNSS receiver 272. The method 400 may be implemented by the GNSS device 200. The method 400 may be carried out by software executed, for example, by a processor, by a GNSS receiver, or by a combination thereof. Steps are identified as being performed by one of the processor and the GNSS receiver, but may be performed by another component. Coding of software for carrying out such a method 400 is within the scope of a person of ordinary skill in the art provided the present disclosure. The method 400 may contain additional or fewer processes than shown and/or described, and may be performed in a different order. Computer-readable code executable by the processor 202 to perform the method 400 may be stored in a computer-readable medium such as a memory of the GNSS device 200.

The method 400 operates when the GNSS receiver 272 is in an active state. The GNSS receiver 272 receives GNSS signals at 402. The GNSS receiver 272 then tacks the received GNSS signals from each of at least four GNSS satellites at 404, as previously explained with reference to FIG. 3. The GNSS receiver 272 must track GNSS signals from each of at least four GNSS satellites at a sufficient quality to be able to be able to calculate the GNSS location.

At step 406, the GNSS receiver 272 computes a signal quality value for the GNSS signals from each of the four tracked GNSS satellites. The signal quality value is any one of a carrier-to-noise (C/No) ratio and a signal-to-noise ratio (SNR). The SNR reflects the ratio of the GNSS signal power and noise power in a given bandwidth. The C/No ratio, on the other hand, reflects the ratio of GNSS signal carrier power and the noise power per unit of bandwidth. Each of the C/No ratio and the SNR provide different views of the signal quality. In one embodiment, the GNSS receiver 272 utilizes a combination of the C/No ratio and the SNR to determine a signal quality value of the GNSS signals.

At step 408, once the GNSS receiver 272 has tracked GNSS signals from each of at least four GNSS satellites, the GNSS receiver 272 computes an average signal quality value for each of the tracked GNSS signals. In some embodiments, the GNSS receiver 272 computes the average signal quality value using only the four largest signal quality values (when the largest signal quality value indicates the best quality signal). In one embodiment, the GNSS receiver 272 computes a C/No ratio for each of the tracked GNSS signals, and computes the average C/No ratio using only the four largest C/No ratios. In another embodiment, the GNSS receiver 272 computes a SNR for each of the tracked GNSS signals, and computes the average SNR ratio using only the four largest SNR ratios.

At step 410, the GNSS receiver 272 compares the average signal quality value, as computed at 408, with a baseline signal quality value. The baseline signal quality value is the minimum signal quality value required to calculate the GNSS location by the GNSS receiver 272. In some embodiments, the baseline signal quality value is the minimum C/No ratio required to calculate the GNSS location by the GNSS receiver 272. In other embodiments, the baseline signal quality value is the minimum SNR required to calculate the GNSS location by the GNSS receiver 272.

The method 400 distinguishes between two scenarios: (i) when the average signal quality is greater than or equal to the baseline signal quality, the GNSS receiver 272 calculates a GNSS location at 414, and (ii) when the average signal quality value is less than the baseline signal quality value, the GNSS receiver 272 continues tracking the GNSS signals at 412. Accordingly, when the signal quality is not of sufficient quality, the method 400 ensures that the GNSS receiver 272 remains active until the signal quality is sufficient to calculate the GNSS location. Additionally, when the signal quality is of sufficient quality, the method 400 deactivates the GNSS receiver 272 to help reduce power consumption of the GNSS device 200.

When the average signal quality is greater than or equal to the baseline signal quality, the method 400 proceeds to 414. At 414, the GNSS receiver 272 calculates the GNSS location, as previously explained. The GNSS receiver 272 then sends the GNSS location data points to processor 202 for processing. The processor 202 stores the GNSS location data points in memory 220 at 416. In some embodiments, the GNSS receiver 272 sends the GNSS location data points to the RAM 208 for temporary storage and the processor 202 accesses the GNSS location data points from the RAM 208.

After the GNSS receiver 272 calculates the GNSS location at 414, the processor 202 deactivates the GNSS receiver 272 to reduce power consumption at 418. In some embodiments, the GNSS device 200 includes a battery power source and is configured to draw power from either the battery power source or an auxiliary power source. In some embodiments, the processor 202 deactivates the GNSS receiver 272 only when the GNSS device 200 is not coupled to an auxiliary power source, and is utilizing the battery power source.

When the average signal quality value is less than the baseline signal quality value, the method 400 proceeds to step 412. At step 412, the GNSS receiver 272 continues tracking the GNSS signals. When a longer tracking time is used, the average signal quality is likely to improve. Accordingly, after a predetermined time at step 412, the method returns to step 406. At step 406, the GNSS receiver 272 computes an updated signal quality value for each of the tracked GNSS signals. At step 408, the GNSS receiver 272 computes an updated average signal quality value of the tracked GNSS signals. The updated average signal quality value is then compared to the baseline signal quality value at step 410. Accordingly, the method operates in a loop until the average signal quality is sufficient to calculate the GNSS location. In some embodiments, a time-out counter is implemented to prevent the method 400 from running indefinitely.

Figure 5:
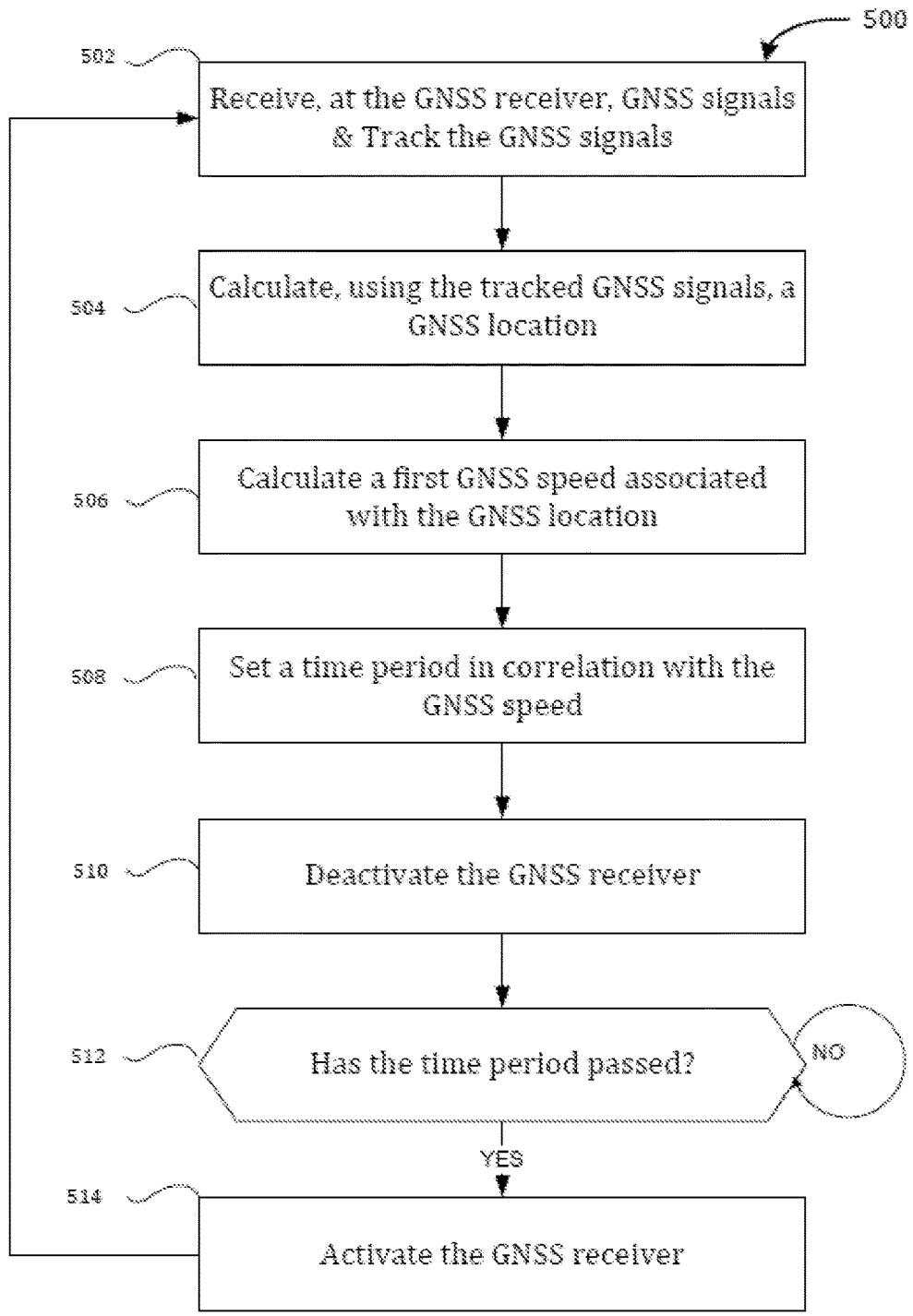
FIG. 5 illustrates a flowchart of a method for activating and deactivating a GNSS receiver of a GNSS device in accordance with example embodiments of the present disclosure.

Reference is now made to FIG. 5 which illustrates a flowchart of a method 500 for activating and deactivating the GNSS receiver 272. The method 500 may be implemented by the GNSS device 200. The method 500 may be carried out by software executed, for example, by a processor, by a GNSS receiver, or by a combination thereof. Steps are identified as being performed by one of the processor and the GNSS receiver, but may be performed by another component. Coding of software for carrying out such a method 500 is within the scope of a person of ordinary skill in the art provided the present disclosure. The method 500 may contain additional or fewer processes than shown and/or described, and may be performed in a different order. Computer-readable code executable by the processor 202 to perform the method 500 may be stored in a computer-readable medium such as a memory of the GNSS device 200.

The method 500 operates when the GNSS receiver 272 is in an active state. The GNSS receiver 272 receives and tracks GNSS signals at 502, as previously explained with reference to FIG. 3. The GNSS receiver 272 must track GNSS signals from each of at least four GNSS satellites at a sufficient quality to be able to be able to calculate the GNSS location, as previously explained with reference to FIG. 4. At step 418 (FIG. 4), the GNSS receiver 272 is deactivated. The method 500 provides an example embodiment for determining how long to deactivate the GNSS receiver 272. In accordance with the method 500, the processor 202 deactivates the GNSS receiver 272 for a time period in correlation with a GNSS speed associated with a GNSS location.

At 504, the GNSS receiver 272 calculates, using the tracked GNSS signals a GNSS location, and at 506, the GNSS receiver 272 calculates a GNSS speed associated with the GNSS location. The GNSS receiver 272 then sends the GNSS speed and GNSS location to the processor 202 and/or the RAM 208.

At 508, the processor 202 sets a time period in correlation with the GNSS speed. In one embodiment, the processor 202 sets the time period as a long time period when GNSS speed indicates the receiver is moving at a high speed, a medium time period when GNSS speed indicates the receiver is moving at a medium speed, and a short time period when GNSS speed indicates the receiver is moving at a low speed.

In one example embodiment, the long time period is 30 seconds, the medium time period is 20 seconds, the short time period is 10 seconds, the high speed is any speed greater than 70 km/hr, the medium speed is any speed greater than 30 km/hr and less than 70 km/hr, and the low speed is any speed greater than 5 km/hr and less than 30 km/hr. The example time period and speed values provided are only exemplary; alternative combinations of time period and speed values may be better suited for other embodiments. The time period and speed value combination are determined based on repetitive testing for a given scenario. For example, the 70 km/hr value is a speed that is well above a city speed limit in the embodiment tested. In other embodiments, if the city speed limit is generally faster, the high speed value may be set as 100 km/hr. In other embodiments, if the city speed limit is generally slower, the high speed value may be set at 50 km/hr. The high speed value is a speed at which the GNSS device is expected to follow a linear path, and the low speed value is a speed at which the GNSS device is expected to deviate from the linear path. Adjustments to the time period and speed value combinations are thus appropriate for other embodiments.

A speed that is well above a city speed limit (e.g. 70 km/hr) indicates that the GNSS device is likely travelling on a highway. Since highways typically follow a linear path, less GNSS location data points are required to trace the path of the GNSS device. Accordingly, only a discrete number of data points are needed to identify a path or route taken by the GNSS device, instead of a continuous (or near-continuous) number of data points. The discrete GNSS location data points may be interpolated to provide information regarding the complete path. On the other hand, when the GNSS device is moving slowing (e.g. less than 5 km/hr), this indicates that the GNSS device is likely performing a turn; i.e. the path is about to change. Accordingly, a large number of discrete GNSS location data points or a continuous (or near-continuous) number of data points is required to effectively identify the path or route taken by the GNSS device.

At step 510, the processor 202 deactivates the GNSS receiver 272 for the time period as set based on the GNSS speed. In some embodiments, the GNSS device 200 includes a battery power source and is configured to draw power from either the battery power source or an auxiliary power source. In some embodiments, the processor 202 deactivates the GNSS receiver 272 only when the GNSS device 200 is not coupled to an auxiliary power source, and is utilizing the battery power source.

At step 512, the processor 202 determines if the time period as passed. After the time period has passed, the processor 202 activates the GNSS receiver 272 at step 514. The method 500 then returns to step 502. The GNSS receiver 272 will then calculate an updated GNSS location and an updated GNSS speed associated with the updated GNSS location. The processor 202 will then reset the time period in correlation with the updated GNSS speed in accordance with the method 500 as previously described.

In some embodiments, the GNSS speed may indicate that the GNSS device 200 is not in motion. When the GNSS device 200 is not in motion, the method 500 may continue tracking the GNSS signals, and periodically computing an updated GNSS location and an updated GNSS speed associated with the updated GNSS location. In some embodiments, the GNSS speed indicates that the GNSS device 200 is not in motion unless the GNSS speed is greater than a predetermined value (e.g. 5 km/hr). This embodiment ensures close monitoring of GNSS location and GNSS speed parameters when the GNSS device 200 is moving slowly. When the GNSS device 200 is moving slowly, the path of motion is likely to include many deviations and turns, which may require close monitoring.

Figure 6:
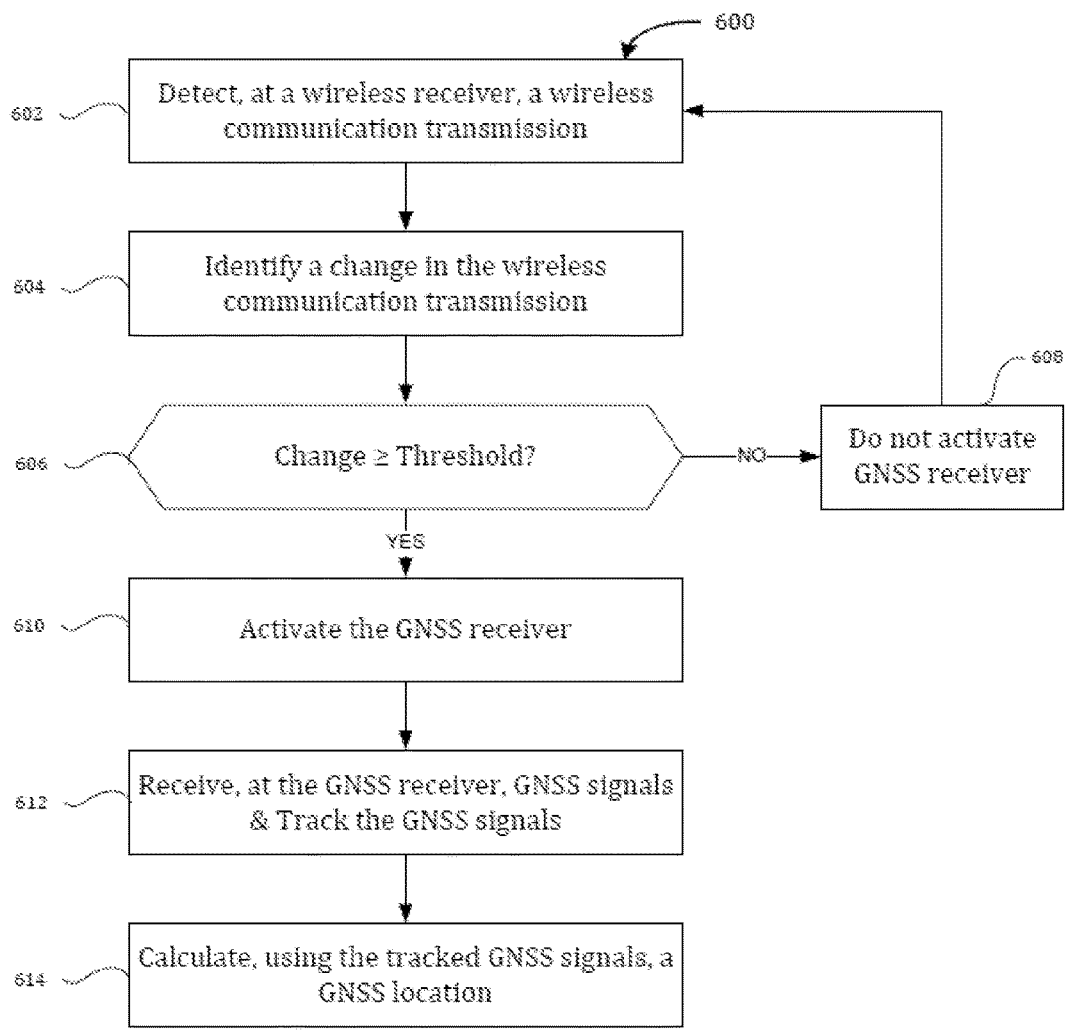
FIG. 6 illustrates a flowchart of a method for activating a GNSS receiver of a GNSS device in accordance with example embodiments of the present disclosure.

Reference is now made to FIG. 6 which illustrates a flowchart of a method 600 for activating the GNSS receiver 272. The method 600 may be implemented by the GNSS device 200. The method 600 may be carried out by software executed, for example, by a processor, by a GNSS receiver, or by a combination thereof. Steps are identified as being performed by one of the processor and the GNSS receiver, but may be performed by another component. Coding of software for carrying out such a method 600 is within the scope of a person of ordinary skill in the art provided the present disclosure. The method 600 may contain additional or fewer processes than shown and/or described, and may be performed in a different order. Computer-readable code executable by the processor 202 to perform the method 600 may be stored in a computer-readable medium such as a memory of the GNSS device 200.

The method 600 provides an example embodiment of activating the GNSS receiver 272. The method 600 relies on monitoring wireless communication transmissions from stationary devices, such as cellular communication network transmissions and wireless local area network transmissions. A change in the wireless communication transmissions from stationary devices indicates that the GNSS device 200 is moving, and serves as a trigger to active the GNSS receiver 272. The method 600 may, for example, be utilized as a trigger to determine whether to activate the GNSS receiver 272 at step 314 (FIG. 3).

At step 602, a receiver of the communication interface 204 of the GNSS device 200 receives one or more wireless communication transmissions. The communication interface 204 does not need to register onto any particular network to receive such wireless communication transmissions. In some embodiments, the communication interface 204 and/or the processor 202 determines an identity associated with each transmission received at the receiver and determine a signal quality parameter associated with each transmission. The processor 202 then stores in temporary memory, such as RAM 208, a table listing the identity and signal quality parameters of each transmission. Examples of the signal quality parameters include, without limitation, received signal strength and signal-to-noise ratio (SNR).

A change in a signal quality parameter associated with a wireless communication transmission indicates that either the transmitter or receiver in the GNSS device 200 has moved. Since the transmissions being monitored are typically stationary, the more likely outcome is that the GNSS device 200 has moved. Accordingly, the processor 202 of the GNSS device 200 monitors for changes in signal quality parameters associated with each wireless communication transmission detected at the GNSS device 200. In some embodiments, the processor 202 continuously updates the table listing the identity and signal quality parameters of each transmission, and monitors for deviations in the signal quality parameters over a predetermined time period.

The processor 202 identifies a change in the signal quality parameters of the wireless communication transmission or transmissions at 604. The change identified may vary based on different use cases. In one embodiment, the change is a variation in the signal strength of the wireless communication transmission. In another embodiment, the change is a variation in the signal strength of one of a plurality of the wireless communication transmissions detected at the receiver. In yet another embodiment, the change is a variation in the signal strength of two or more wireless communication transmissions of a plurality of wireless communication transmissions.

The processor 202, at step 606, then compares the change with a threshold change to determine whether the change in the wireless communication transmission exceeds a threshold change. The threshold change is predetermined based on testing for different use cases. In one embodiment, the threshold change is a change of the signal strength or SNR of one wireless communication transmission by a predefined number of units (e.g. 10 dB). In another embodiment, the threshold change is a change of the signal strength or SNR of two or more wireless communication transmissions by a predefined number of units (e.g. 10 dB). By defining the threshold change as a change in more than one wireless communication transmission, the embodiment provides greater certainty and less false positive triggers (i.e. indicates that the GNSS device 200 is moving when it is not). However, the embodiment is less reactive to movement of the GNSS device 200. Accordingly, the threshold change may be adjusted by varying either the predefined value of the threshold change (e.g. 10 dB, 20 dB, 30 dB, etc.) or by varying the number of wireless communication transmissions required to meet the threshold change (e.g. one transmission, two transmissions, three transmissions, etc.).

When the processor 202 determines that the change does not exceed the threshold change (i.e. the GNSS device 200 is not in motion), the method proceeds to step 608. At step 608, the processor 202 does not activate the GNSS receiver 272 and the method proceeds to step 602. Accordingly, the processor 202 is continuously detecting wireless communication transmissions and is continuously monitoring for changes in the detected transmissions.

When the processor 202 determines that the change exceeds the threshold change (i.e. the GNSS device 200 is in motion), the method proceeds to step 610. At step 610, the processor 202 activates the GNSS receiver 272. At step 612, the GNSS receiver 272 receives and tracks GNSS signals. At step 614, the GNSS receiver 272 calculates a GNSS location using the tracked GNSS signals. The GNSS location data points may then be stored in memory 220.

Figure 7:
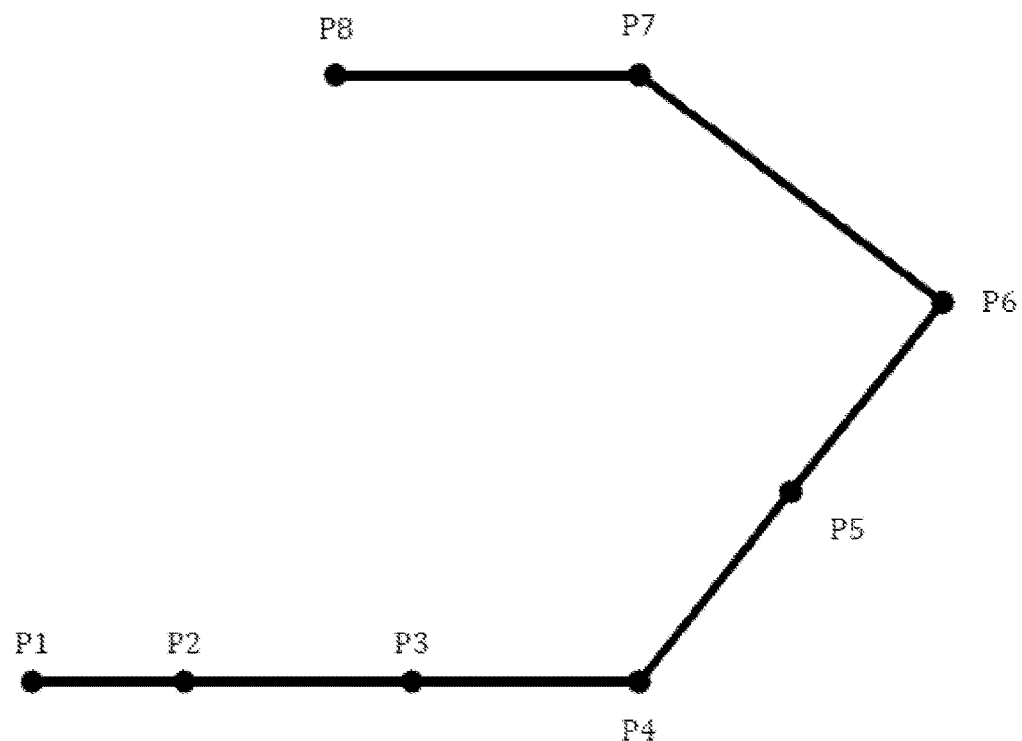
FIG. 7 illustrates a trace of GNSS location data points.

Reference is now made to FIG. 7, which illustrates eight example GNSS location data points (P1-P8), as calculated by the GNSS receiver 272. The GNSS location data points are stored in memory 220 of the GNSS device 200. The GNSS data points trace a path or route traveled by the GNSS device 200. In the example illustration, the path begins at P1 and ends at P8, and is made up of four sub-paths: (1) P1-P2-P3-P4; (2) P4-P5-P6; (3) P6-P7; and (4) P7-P8. Each sub-path is a straight path defined by two or more GNSS location data points. The first sub-path is defined by the GNSS location data points P1, P2, P3 and P4. However, the GNSS location data point P2 and P3 do not provide any additional information from the GNSS location data points P1 and P4. Since GNSS device 200 maintains the same bearing as it travels from P1 to P4, only two data points are needed to identify the sub-path: P1 and P4. Accordingly, and in accordance with the method 800, as will be explained, the GNSS location data points P2 and P3 are not stored in memory 220 (or are stored in memory only temporarily then deleted). The GNSS device 200 will thus store fewer GNSS location data points in memory. Furthermore, if the GNSS device 200 is configured to send the GNSS location data points to the server 104, the GNSS device 200 will use less data and less power to send the data points since fewer data points will be sent.

Figure 8:
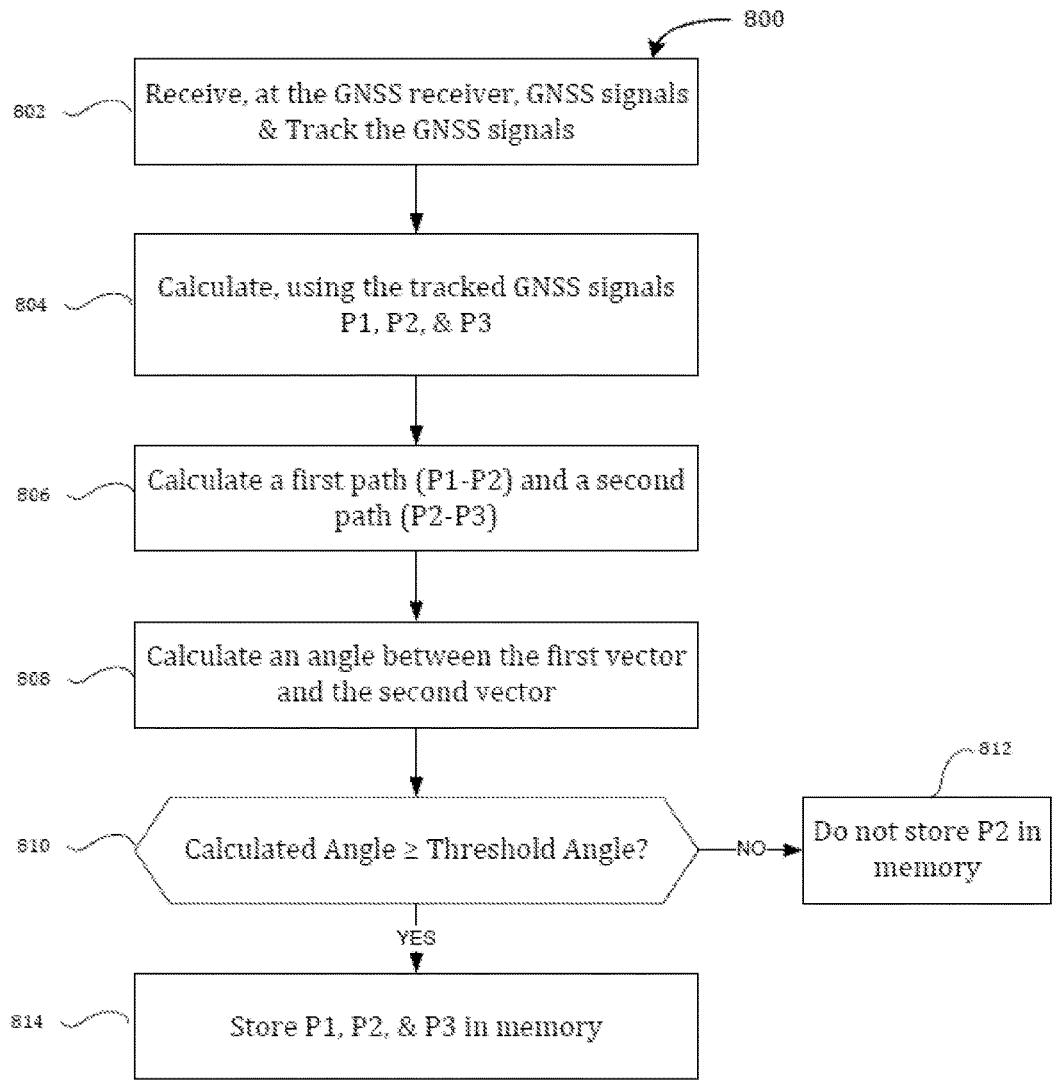
FIG. 8 illustrates a flowchart of a method for storing GNSS location data points generated by a GNSS device in accordance with example embodiments of the present disclosure.

Reference is now made to FIG. 8 which illustrates a flowchart of a method 800 for storing GNSS location data points as calculated by the GNSS receiver 272 (e.g. in accordance with the methods 300, 400, 500, and 600). The method 800 may be implemented by the GNSS device 200. The method 800 may be carried out by software executed, for example, by a processor, by a GNSS receiver, or by a combination thereof. Steps are identified as being performed by one of the processor and the GNSS receiver, but may be performed by another component. Coding of software for carrying out such a method 800 is within the scope of a person of ordinary skill in the art provided the present disclosure. The method 800 may contain additional or fewer processes than shown and/or described, and may be performed in a different order. Computer-readable code executable by the processor 202 to perform the method 800 may be stored in a computer-readable medium such as a memory of the GNSS device 200.

At step 802, the GNSS receiver 272 receives and tracks GNSS signals. At step 804, the GNSS receiver 272 calculates three GNSS locations using the tracked GNSS signals: a first GNSS location (P1), a second GNSS location (P2), and a third GNSS location (P3). P1, P2, and P3 may be thought of as three discrete points defining a path. P1, P2, and P3 are calculated one after the other: P1 is associated with the position of the GNSS device 200 at an initial time, and P3 is associated with the position of the GNSS device 200 at an end time. P2 is associated with the position of the GNSS device 200 at a time in between the initial time and the end time.

After calculating the GNSS locations P1, P2, and P3, data points associated with the GNSS locations P1, P2, and P3 are sent to the processor 202 for further processing. At step 806, the processor 202 calculates a first path between P1 and P2 (Path P1-P2) and a second path between P2 and P3 (Path P2-P3). In some embodiments, the processor 202 computes the path between two points by computing a distance and a bearing between the two points. In some embodiments, the processor 202 computes the shortest distance over the earth's surface between the two points.

At step 808, the processor 202 calculates an angle between the first and second paths. In some embodiments, the processor 202 computes the angle between the two paths by subtracting the bearing value of second path from the bearing value of the first path. The angle between the first and second paths indicates whether the GNSS device 200 is a single straight path or has taken a turn. If the GNSS device 200 has taken a turn, then the second GNSS location data point (P2) indicates the start of a new sub-path.

To determine if the GNSS device 200 has taken a turn, the processor 202 compares the calculated angle between the two paths and a threshold angle at step 810. The threshold angle may vary in dependence on each use case. A large threshold angle will 'smooth' the data points, potentially obscuring some turns. A small threshold angle ensures that the data points stored reflect any significant turn between the first and second paths. In one particular embodiment, the threshold angle is 5 degrees.

When the angle between the first and second paths is less than the threshold angle (i.e. the path P1-P2-P3 is a straight path), the method 800 proceeds to step 812. At step 812, the processor 202 does not store the second GNSS location data point (P2) in memory. In some embodiments, P2 is stored in memory prior to step 812; therefore, at 812, the processor 202 deletes P2 from memory. The processor 202 nonetheless stores the first and third GNSS location data points (P1 and P3) in memory 220.

When the angle between the first and second paths is greater than or equal to the threshold angle (i.e. the path P1-P2-P3 includes a turn at P2), the method 800 proceeds to step 814. At step 814, the processor 202 stores the second GNSS location data point (P2) in a memory 220 to reflect that a turn occurred at P2, and P2 is the beginning of a new sub-path. Furthermore, at step 814, the processor 202 also stores the first and third GNSS location data points (P1 and P3) in a memory 220.

The processor 202 may execute the method 800 for every three GNSS location data points. The second GNSS location data point may at times be stored in memory 220, and at times removed from memory 220. For example, for the path of FIG. 7, the processor 202 executes the method 800 first using P1, P2, and P3 as inputs. Since the angle between Path P1-P2 and Path P2-P3 does not change in this example, the processor 202 does not store the data point associated with P2 in memory 220. At the second iteration of the method 800, the processor 202 executes the method 800 first using P3, P4, and P5 as inputs. Since the angle between Path P3-P4 and Path P4-P5 changes in this example, the processor 202 stores the data point associated with P4 in memory 220. At the third iteration of the method 800, the processor 202 executes the method 800 first using P4, P5, and P6 as inputs. Similarly, the processor 202 does not store the data point associated with P5 in memory 220. At the fourth iteration of the method 800, the processor 202 executes the method 800 first using P6, P7, and P8 as inputs. Similarly, the processor 202 stores the data point associated with P7 in memory 220. Accordingly, the processor 202 runs through several GNSS location data points in order and in sets of three to identify redundant data points. The processor 202 may execute the method 800 whilst the GNSS receiver 272 is active, using live data from the GNSS receiver 272, or may execute the method 800 after the GNSS receiver 272 is deactivated, using data stored in memory 220. Optionally, after executing the method 800 onto a data set, the processor 202 may send all non-redundant GNSS location data points to the server 104.

In accordance with the foregoing disclosure, in one embodiment, the present invention provides a GNSS device having a processor, memory, a GNSS receiver, and a communication interface. The GNSS device is configured to receive and track GNSS signals, calculate GNSS locations using the tracked GNSS signals, and store GNSS location data in the memory. Furthermore, in some embodiments, the GNSS device is configured to operate in a system including the GNSS device, a server, and a user device. The GNSS device sends the GNSS location data to the server for storage and processing. The user device can then access the GNSS location data from the server.

The GNSS device is further configured to calculate and store multiple GNSS location data points over a period of time. The GNSS location data points can be used to trace a path or route traveled by the GNSS device. For example, if the GNSS device is fitted in a car, the GNSS location data points will provide information regarding the route the car took. The GNSS location data points may be overlaid onto a map to provide information regarding specific streets the car took.

The GNSS device is further configured to deactivate the GNSS receiver in accordance with the embodiments disclosed. The GNSS device activates the GNSS receiver only when needed. The GNSS receiver receives and tracks GNSS signals when active. The GNSS device processes the information provided in the GNSS signals to compute a GNSS location, and stores the GNSS location in memory. Once the location is computed or after the GNSS signal is tracked, the GNSS device deactivates the GNSS receiver to conserve battery power. The disclosure provides several embodiments of methods to deactivate the GNSS receiver to reduce power consumption.

In one embodiment, the GNSS receiver monitors a measure of signal quality of the received GNSS signals, such as a signal-to-noise (SNR) ratio or a carrier-to-noise (C/No) ratio. By monitoring the signal quality of the received GNSS signals, the GNSS device can determine when the signal is of sufficient quality to decode the information provided in the GNSS signals and to calculate a GNSS location. When the signal is of sufficient quality to compute the GNSS location, the GNSS device deactivates the GNSS receiver to conserve power. The GNSS receiver is then activated a later time as required. On the other hand, when the GNSS signal is not of sufficient quality to compute the GNSS location, the GNSS receiver remains active to acquire and track a signal of higher quality.

In accordance with the foregoing disclosure, in another embodiment of the present invention, there is described a method and GNSS device for deactivating a global navigation satellite system (GNSS) receiver. The GNSS device tracks a GNSS signal from each of at least four GNSS satellites, computes an average signal quality value of the tracked GNSS signals, and when the average signal quality value is greater than or equal to a baseline signal quality value, calculates a GNSS location, and deactivates the GNSS receiver. In some embodiments, the GNSS device stores the GNSS location in memory when the average signal quality value is greater than or equal to a baseline signal quality value. In some embodiments, when the average signal quality value is less than the baseline signal quality value, the GNSS device continues tracking the GNSS signals, and computes an updated average signal quality value of the tracked GNSS signals, and when the updated average signal quality value is greater than or equal to the baseline signal quality value, calculates the GNSS location, and deactivates the GNSS receiver. As previously indicated, in some embodiments, the signal quality value is a carrier-to-noise (C/No) ratio, and the baseline signal quality value is the minimum C/No ratio required to calculate the GNSS location by the GNSS receiver. In some embodiments, the GNSS device computes the average signal quality value by computing a C/No ratio for each of the tracked GNSS signals, and computing the average C/No ratio using only the four largest C/No ratios.

In one embodiment, the GNSS device monitors a speed associated with the GNSS location. A speed that is well above a city speed limit (e.g. 70 km/hr) indicates that the GNSS device is likely travelling on a highway. Since highways typically follow a linear path, less GNSS location data points are required to trace the path of the GNSS device. Accordingly, only a discrete number of data points is needed to identify a path or route taken by the GNSS device, instead of a continuous (or near-continuous) number of data points. The discrete GNSS location data points may be interpolated to provide information regarding the complete path. On the other hand, when the GNSS device is moving slowing (e.g. less than 5 km/hr), this indicates that the GNSS device is likely performing a turn; i.e. the path is about to change. Accordingly, a large number of discrete GNSS location data points or a continuous (or near-continuous) number of data points is required to effectively identify the path or route taken by the GNSS device. Accordingly, in accordance with one embodiment of the present disclosure, the GNSS device deactivates the GNSS receiver for a time period in correlation with the speed associated with the GNSS location.

A method and GNSS device for deactivating a global navigation satellite system (GNSS) receiver are further described in the foregoing disclosure. The GNSS device calculates a GNSS location and a GNSS speed associated with the GNSS location; sets a time period in correlation with the GNSS speed; and deactivates the GNSS receiver for the time period. In some embodiments, the GNSS device sets the time period as a long time period when the GNSS speed indicates the receiver is moving at a high speed, a medium time period when the GNSS speed indicates the receiver is moving at a medium speed, and a short time period when the GNSS speed indicates the receiver is moving at a low speed. In some embodiments, the long time period is 30 seconds, the medium time period is 20 seconds, the short time period is 10 seconds, the high speed is any speed greater than 70 km/hr, the medium speed is any speed greater than 30 km/hr and less than 70 km/hr, and the low speed is any speed greater than 5 km/hr and less than 30 km/hr. In some embodiments, the GNSS device activates the GNSS receiver after the time period has passed; calculates an updated GNSS location and an updated GNSS speed associated with the updated GNSS location; and resets the time period in correlation with the updated GNSS speed. In some embodiments, the GNSS speed indicates that the GNSS device is not in motion, and the GNSS device continues tracking the GNSS signals, and computes an updated location and an updated GNSS speed associated with the updated GNSS location.

In another embodiment described herein, the GNSS device monitors an angle associated with a path taken by the GNSS device. A path is identified by multiple GNSS location data points. When the path is a straight path, only two data points are needed to recreate the path; a starting point and an ending point. To recreate a path with one or more turns, a data point should be collected at each turn. Accordingly, a path is made up of several sub-paths, each sub-path having a different bearing. The most efficient means of storing a representation of the path is to store a data point at the starting point of each sub-path and a data point at the ending point of the last sub-path. In accordance with one embodiment of the present disclosure, the GNSS device monitors the angle between each two data points. The GNSS device stores data points associated with a change in the bearing, as indicated by the angle. The GNSS device therefore requires less storage space. Furthermore, if and when the GNSS device sends the GNSS location data to the server, the GNSS device will send less data and consume less power.

The foregoing disclosure further describes a method and GNSS device for storing global navigation satellite system (GNSS) location data. The GNSS device calculates a first GNSS location, a second GNSS location, and a third GNSS location; calculates a first path between the first and second GNSS locations, and a second path between the second and third GNSS locations; calculates an angle between the first and second paths; and when the angle is greater than or equal to a threshold angle, stores the second GNSS location in a memory. In some embodiments, the GNSS device stores the second GNSS location in the memory when the angle is greater than or equal to the threshold angle. In some embodiments, the GNSS device stores the first and third GNSS location in the memory. In some embodiments, when the angle is greater than or equal to a threshold angle, the GNSS device sends the first and third GNSS location to a server. In some embodiments, the GNSS device sends the second GNSS location to the server when the angle is greater than or equal to the threshold angle.

In another embodiment described herein, the GNSS device determines when to activate the GNSS receiver by monitoring background wireless communication transmissions from cellular-towers and/or wireless local area networks, or other physically stationary transmissions. Since the cellular-towers and wireless local area networks are stationary, a change in the wireless communication transmissions indicates that the GNSS device is moving. The GNSS device thus activates the GNSS receiver to track the location of the GNSS device as it moves. Accordingly, the wireless communication transmissions are used to trigger the activation of the GNSS receiver, and permits the GNSS device to deactivate the GNSS receiver when the GNSS device is not moving, thereby reducing power consumption.

As further described herein, the within disclosure discloses a method and GNSS device for activating a global navigation satellite system (GNSS) receiver. The GNSS device detects, at a wireless receiver, a wireless communication transmission; identifies a change in the wireless communication transmission; determines whether the change in the wireless communication transmission exceeds a threshold change; and in response to determining the change exceeds the threshold change, activates the GNSS receiver, and calculates a GNSS location. In one embodiment, the wireless communication transmission is associated with any one of wireless local area network and a cellular communication network. In one embodiment, the change is a variation in the signal strength of the wireless communication transmission. In one embodiment, the GNSS device detects at the wireless receiver, a plurality of wireless communication transmissions. In one embodiment, the change is a variation in the signal strength of one of the plurality of the wireless communication transmissions. In one embodiment, the change is a variation in the signal strength of two or more wireless communication transmissions of the plurality of the wireless communication transmissions. In one embodiment, the GNSS device activates the GNSS receiver and calculates the GNSS location only when the change exceeds the threshold change.

In accordance with the foregoing, the within disclosure describes methods of managing the power consumption of a GNSS receiver by identifying when to activate and deactivate the GNSS receiver, and by managing storage of GNSS location data points. The above-described embodiments of the present disclosure are intended to be examples only. Those of skill in the art may affect alterations, modifications, and variations to the particular embodiments without departing from the scope of the application. For instance, the steps may be performed in a differing order, or steps may be added, deleted, or modified. The teachings of the present disclosure are intended to cover and embrace all suitable changes in technology.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

We claim:

1. A method for deactivating a global navigation satellite system (GNSS) receiver, the method comprising:
   tracking a GNSS signal from each of at least four GNSS satellites;
   computing an average signal quality value of the tracked GNSS signals; and
   when the average signal quality value is greater than or equal to a baseline signal quality value,
      calculating a GNSS location, and
      deactivating the GNSS receiver.

2. The method of claim 1 further comprising storing the GNSS location in memory when the average signal quality value is greater than or equal to a baseline signal quality value.

3. The method of claim 1, further comprising:
   when the average signal quality value is less than the baseline signal quality value,
      continued tracking of the GNSS signals, and
      computing an updated average signal quality value of the tracked GNSS signals; and
   when the updated average signal quality value is greater than or equal to the baseline signal quality value,
      calculating the GNSS location, and
      deactivating the GNSS receiver.

4. The method of claim 2, wherein the signal quality value is a carrier-to-noise (C/No) ratio, and wherein the baseline signal quality value is the minimum C/No ratio required to calculate the GNSS location by the GNSS receiver.

5. The method of claim 4, wherein computing the average signal quality value comprises:
   computing a C/No ratio for each of the tracked GNSS signals; and
   computing the average C/No ratio using only the four largest C/No ratios.

6. The method of claim 1, further comprising
   calculating a GNSS speed associated with the GNSS location;
   setting a time period in correlation with the GNSS speed; and
   wherein the GNSS receiver is deactivated for the time period.

7. The method of claim 6, further comprising setting the time period as:
   a long time period when the GNSS speed indicates the receiver is moving at a high speed,
   a medium time period when the GNSS speed indicates the receiver is moving at a medium speed, and
   a short time period when the GNSS speed indicates the receiver is moving at a low speed.

8. The method of claim 7, wherein the long time period is 30 seconds, the medium time period is 20 seconds, the short time period is 10 seconds, the high speed is any speed greater than 70 km/hr, the medium speed is any speed greater than 30 km/hr and less than 70 km/hr, and the low speed is any speed greater than 5 km/hr and less than 30 km/hr.

9. A global navigation satellite system (GNSS) device comprising:
   a processor;
   a GNSS receiver configured to:
      track a GNSS signal from each of at least four GNSS satellites,
      compute an average signal quality value of the tracked GNSS signals, and
      calculate a GNSS location when the average signal quality value is greater than or equal to a baseline signal quality value; and
   a memory coupled to the processor and storing instructions for deactivating the GNSS receiver, wherein the processor is configured to:
      deactivate the GNSS receiver when the average signal quality value is greater than or equal to a baseline signal quality value.

10. The GNSS device of claim 9, wherein the processor is further configured to store the GNSS location in the memory when the average signal quality value is greater than or equal to a baseline signal quality value.

11. The GNSS device of claim 9, wherein
   the GNSS receiver is further configured to:
      continue tracking the GNSS signals, and compute an updated average signal quality value of the tracked GNSS signals when the average signal quality value is less than the baseline signal quality value, and
      calculate the GNSS location when the updated average signal quality value is greater than or equal to the baseline signal quality value; and
   wherein the processor is further configured to deactivate the GNSS receiver when the updated average signal quality value is greater than or equal to the baseline signal quality value.

12. The GNSS device of claim 10, wherein the signal quality value is a carrier-to-noise (C/No) ratio, and wherein the baseline signal quality value is the minimum C/No ratio required to calculate the GNSS location by the GNSS receiver.

13. The GNSS device of claim 12, wherein the GNSS receiver is further configured to compute the average signal quality value by:
- computing a C/No ratio for each of the tracked GNSS signals; and
- computing the average C/No ratio using only the four largest C/No ratios.

14. The GNSS device of claim 9,
- wherein the GNSS receiver is further configured to calculate a GNSS speed associated with the GNSS location; and
- wherein the processor is further configured to set a time period is in correlation with the GNSS speed, and deactivate the GNSS receiver for the time period.

15. The GNSS device of claim 14, wherein the processor is further configured to set the time period as:
- a long time period when the GNSS speed indicates the receiver is moving at a high speed,
- a medium time period when the GNSS speed indicates the receiver is moving at a medium speed, and
- a short time period when the GNSS speed indicates the receiver is moving at a low speed.

16. The GNSS device of claim 15, wherein the long time period is 30 seconds, the medium time period is 20 seconds, the short time period is 10 seconds, the high speed is any speed greater than 70 km/hr, the medium speed is any speed greater than 30 km/hr and less than 70 km/hr, and the low speed is any speed greater than 5 km/hr and less than 30 km/hr.

17. The GNSS device of claim 14,
- wherein the processor is further configured to activate the GNSS receiver after the time period has passed;
- wherein the GNSS receiver is further configured to calculate an updated GNSS location and an updated GNSS speed associated with the updated GNSS location; and
- wherein the processor is further configured to reset the time period in correlation with the updated GNSS speed.

18. The GNSS device of claim 14, wherein the GNSS speed indicates that the GNSS device is not in motion, and wherein the GNSS receiver is further configured to
- continue tracking the GNSS signals, and
- compute an updated location and an updated GNSS speed associated with the updated GNSS location.

\* \* \* \* \*